3,519,648
Patented July 7, 1970

3,519,648
4,9-DIHYDROTHIENO(2,3-B)BENZO(E) THIEPINE DERIVATIVES
Miroslav Protiva and Miroslav Rajsner, Prague, Czechoslovakia, assignors to SPOFA, Sdruzeni Podniku Pro Zdravotnickou vyrobu, Prague, Czechoslovakia
No Drawing. Continuation of application Ser. No. 410,726, Nov. 12, 1964. This application Nov. 4, 1968, Ser. No. 774,584
Claims priority, application Czechoslovakia, Aug. 31, 1963, 4,850/63
Int. Cl. C07d 27/04, 29/34, 63/18
U.S. Cl. 260—329                                6 Claims

ABSTRACT OF THE DISCLOSURE

An antihistominic compound of the general formula:

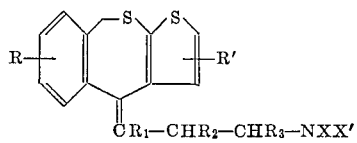

$$\overset{\|}{C}R_1-CHR_2-CHR_3-NXX'$$

wherein R is selected from the group consisting of hydrogen, halogen, lower alkyl, lower alkoxy, lower alkylmercapto and trifluoromethyl, wherein R' is selected from the group consisting of hydrogen, halogen, lower alkyl, lower alkoxy, lower alkylmercapto and trifluoromethyl, wherein $R_1$, $R_2$ and $R_3$ are each selected from the group consisting of hydrogen and lower alkyl in which case NXX' is selected from the group consisting of lower alkyl amino radicals and saturated heterocyclic amino radicals, the latter having 4 to 5 carbon atoms, and wherein if two of the substituents $R_1$, $R_2$ and $R_3$ are hydrogen, the third of said substituents together with X may be an alkylene chain of 2–4 carbon atoms in which case X' is lower alkyl of 1–4 carbon atoms.

---

This application is a continuation of our copending application Ser. No. 410,726 filed Nov. 12, 1964, for "4,9-dihydrothieno-(2,3-B) - benzo(E) - thiepine derivatives," now abandoned, which in turn is a continuation-in-part of our copending application Ser. No. 392,279, filed Aug. 26, 1964, for "New Derivatives of 4,9-dihydrothieno/2,3-b/benzo/e/thiepine, Salts and Quaternary Salts Thereof, and the Method of Preparing Same," now abandoned.

The present invention relates to new derivatives of 4,9-dihydrothieno(2,3-b)benzo(e)thiepine, to acid salts thereof and to quaternary salts thereof, as well as to the method of producing these compounds.

It is a primary object of the present invention to provide for the production of a new group of compounds of the above type, which compounds exhibit neurotropic and psychotropic activity.

It is another object of the present invention to provide such compounds which have psychosedative, antidepressive, antihistaminic and antiemetic activity, as well as other important pharmaceutical activities.

It is still a ufrther object of the present invention to provide for the production of these new compounds.

With the above and other objects in view, the present invention mainly comprises a compound selected from the group consisting of compounds of the formula:

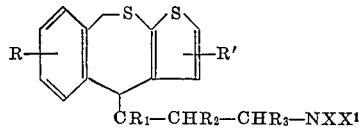

$$\overset{\|}{C}R_1-CHR_2-CHR_3-NXX^1$$
                                                                I wherein R is selected from the group consisting of hydrogen, halogen, lower alkyl, lower alkoxy, lower alkylmercapto and trifluoromethyl, wherein R' is selected from the group consisting of hydrogen, halogen, lower alkyl, lower alkoxy, lower alkylmercapto and trifluoromethyl, wherein $R_1$, $R_2$ and $R_3$ are each selected from the group consisting of hydrogen and lower alkyl in which case NXX' is selected from the group consisting of lower aliphatic amine radicals and saturated heterocyclic amine radicals of 2–6 carbon atoms, and two of the substituents $R_1$, $R_2$, and $R_3$ are hydrogen and the third of said substituents together with X is an alkylene chain of 2–4 carbon atoms and X' is lower alkyl of 1–4 carbon atoms; and physiologically compatible acid addition salts and quaternary salts thereof.

The compound of Formula I above, (including the acid addition salts and quaternary salts thereof) exhibit a significant neurotropic and psychotropic effect. Thus, the acid salts thereof exhibit primarily psychosedative, antidepressive, antihistaminic and antiemetic activity, while the quaternary salts thereof mainly exhibit spasmolytic, ganglioplegic and hypotensive activity.

The compounds of the present invention are produced by reacting a substituted phthalide of the formula:

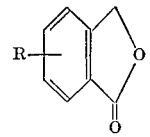

II with a substituted 2-mercaptothiophene of the formula:

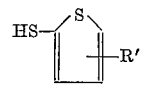

III to form the corresponding 2-(2-trienylmercaptomethyl)-benzoic acid of the formula:

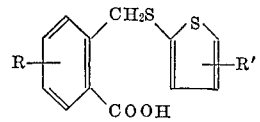

IV wherein R and R' always have the same definitions as above.

The thus obtained acids are cyclized by the action of polyphosphoric acid to form the corresponding 4,9-dihydrothieno(2,3-b)benzo(e)thiepin-4-one of the formula:

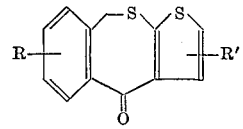

V wherein R and R' have the same definitions as above. The resulting ketone is reacted with a Grignard reagent of the formula:

$$ClMg-CHR_1-CHR_2-CHR_3-NXX'  \qquad VI$$

wherein $R_1$, $R_2$, $R_3$, X and X' have the same definitions as above.

The resulting tertiary alcohol thus obtained, which has the following formula:

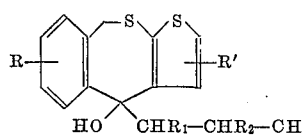

$$HO \quad CHR_1-CHR_2-CHR_3-NXX'  \qquad VII$$

is dehydrated and the resulting base is converted by neutralization with acids to salts, or by the addition of an alkyl halide to the corresponding quaternary salt.

The first stage reaction in the process of the present invention, wherein the phthalide of Formula II is reacted with the mercaptothiophene of Formula III, is preferably carried out in boiling solution of an equivalent of sodium ethylate in ethanol, which results in the production of the 2-(2-thienylmercaptomethyl)benzoic acid of Formula IV in excellent yield. This acid, and its derivatives, are crystalline and can be purified by crystallization from benzene or from a benzene-petroleum ether mixture.

In the second stage of the reaction, the cyclization of the acid of Formula IV is preferably carried out by the action of polyphosphoric acid, preferably using as the reaction medium an aromatic hydrocarbon such as toluene. The reaction is conveniently carried out at the boiling temperature of the reaction mixture to form the corresponding 4,9-dihydrothieno(2,3-b)benzo(e)thiepin-4-one of the Formula V, or a derivative thereof. The resulting ketone can be purified by distillation in vacuo. Mainly solid crystalline substances are obtained which can be recrystallized, for example from ethanol. The Grignard reagent of Formula VI which is used in the third stage of the synthesis (reaction thereof with the ketone of Formula V) is prepared in usual manner from the corresponding aminoalkyl chloride, for example from 3-dimethylaminopropyl chloride, 3-diethylaminopropyl chloride, 3-pyrrolidinopropyl chloride, 3-piperidinopropyl chloride, 3-morpholinopropyl chloride, 3-(N - methyl-piperazino)-propyl chloride, 2-(N-methyl-2-piperidyl)-ethyl chloride, N-methyl-3-piperidylmethyl chloride, N-methyl-4-piperidyl chloride, 2-(N-methyl-2-pyrrolidyl)-ethyl chloride, etc. The most suitable medium for this reaction is tetrahydrofurane, though of course it is also possible to use ether or mixtures thereof with benzene.

There is obtained from this stage of the reaction the corresponding 4-(3 - dimethylaminopropyl)-4,9-dihydro-thieno(2,3-b)benzo(e)thiepin-4-ol, or its analog, of Formula VII, which is obtained in excellent yield. These tertiary alcohols are universally crystalline and can be purified by crystallization from ethanol. The compound very easily loses one molecule of water, which dehydration is the essence of the final step of the synthesis.

The dehydration is preferably carried out by warming with a dilute mineral acid. It can also be carried out by means of acetyl chloride in ether, thionyl chloride in pyridine, phosphorus oxychloride in pyridine, as well as by many of a series of other dehydrating agents.

The dehydration results in the desired compounds of Formula I, the simplest representative of which is 4-(3-dimethylaminopropylidene) - 4,9 - dihydrothieno(2,3-b)-benzo(e)thiepine. These basic substances are oily liquids that can be purified by distillation under vacuum. They can also be converted in crude state, by neutralization with acids to the corresponding acid salts, of which the hydrochloride crystallizes particularly well. These salts are reasonably soluble in water. The quaternary salts are prepared by the addition of lower alkyl halides, for example methyl iodide or methyl bromide, ethyl iodide or ethyl bromide, or the like.

The following examples are given to further illustrate the present invention. The scope of the invention is not however, meant to be limited to the specific details of the examples.

EXAMPLE 1

1st stage 2.9 g. of sodium are dissolved in 45 cc. of absolute-ethanol, and 14.7 g. of 2-mercapto-thiophene and then 17 g. of phthalide are added to the formed sodium ethylate solution. The mixture is boiled for 2 hours under refluxing, then cooled, diluted with 200 cc. of water, and the solution is acidified with dilute hydrochloric acid. The crystalline precipitate which is eliminated is filtered off under suction, washed with water and recrystallized from dilute ethanol. There is obtained 22.5 g. (71% of the theoretical) of 2-(2-thienylmercaptomethyl)-benzoic acid which melts at 116–117° C. (after additional crystallization from benzene-petroleum ether mixture.

2nd stage 173 g. of phosphorus pentoxide are added to 115 cc. of 85% phosphoric acid under stirring, and after thorough homogenization, 570 cc. of absolute toluene and 57.6 g. of 2-(2-thienylmercaptomethyl)-benzoic acid are added. The thus obtained mixture is stirred and boiled under reflux for 4.5 hours. After cooling, the toluene layer is separated, the polyphosphoric acid layer is extracted with additional toluene. The toluene solutions are united and washed with 10% sodium hydroxide solution, dried with anhydrous potassium carbonate, and evaporated under reduced pressure. The residue is purified by distillation, B.P. 178° C./0.25 mm. The resulting product is the desired 4,9 - dihydrothieno(2,3 - b)benzo(e)thiepin-4-one, which solidifies into crystalline form upon standing. Upon recrystallization from ethanol, the product melts at 53–55° C., the product crystallizing as fine needles.

3rd stage

A grain of iodine in a few drops of ethyl bromide are added to a mixture of 10 cc. of absolute tetrahydrofurane and 2.4 g. of magnesium. When the reaction starts, a solution of 12 g. of 3-dimethylaminopropyl chloride in 20 cc. of tetrahydrofurane is added dropwise at a rate adjusted to bring the mixture to a boil under reflux. The mixture is boiled for 1.5 hours under stirring, and the thus formed Grignard reagent solution is cooled with ice water and the solution of 11.5 g. of 4,9-dihydrothieno(2,3-b)-benzo(e)thiepin-4-one in an additional 20 cc. of tetrahydrofurane is added dropwise with stirring during a time period of 25 minutes. The mixture is stirred for an additional hour at room temperature, and is then decomposed under external cooling by the dropwise addition of 15 g. of ammonium chloride in 100 cc. of water with 50 cc. of chloroform added, and after separation of the organic phase, the aqueous layer is extracted with additional chloroform.

The united portions with the organic phase are dried with anhydrous potassium carbonate, and the chloroform evaporated.

The residue (17 g.) is dissolved in 12 cc. of benzene, and crystallization is started by the addition of 35 cc. of petroleum ether. There is thus obtained 11.1 g. (70% of the theoretical) of 4-(3-dimethylaminopropyl)-4,9-dihydrothieno(2,3-b)benzo(e)thiepin - 4 - ol which melts at 118–119° C. (ethanol).

4th stage 7.2 g. of 4-(3-dimethylaminopropyl)-4,9-dihydrothieno-(2.3-b)benzo(e)thiepin-4-ol are dissolved in 70 cc. of dilute sulfuric acid (1:9) and the solution is boiled under refluxing for 15 minutes. It is then filtered with a small amount of activated charcoal, the filtrate is alkalinized with 40 cc. of concentrated aqueous ammonia, the base which is eliminated is extracted with chloroform, the extract is dried with anhydrous potassium carbonate and evaporated. The oily evaporation residue (5.7 g.) is dissolved in 10 cc. of absolute ethanol and the solution acidified with anhydrous ethereal hydrogen chloride. After standing overnight, the eliminated hydrochloride of 4-(3-dimethylaminopropylidene) - 4,9 - dihydrothieno (2,3-b)-benzo(e)thiepine is filtered off under suction, washed with ethanol and ether. The yield is 5.9 g. (78% of the theoretical), and the melting point is 243–244° C.

EXAMPLE 2

This example is carried out exactly as Example 1, except that in the third stage of the process instead of using 12 g. of 3-dimethylaminopropyl chloride, there is used 15 g. of 3-diethylaminopropyl chloride.

The resulting compound is 4-(3-diethylaminopropylidene)-4,9-dihydrothieno(2,3 - b)benzo(e)thiepine which is obtained in the form of its hydrochloride.

EXAMPLE 3

This example is carried out exactly as Example 1, except that in the third stage of the process, instead of using 12 g. of 3-dimethylaminopropyl chloride, there is used 16 g. of piperidylpropyl chloride.

The resulting compound is the hydrochloride of 4-piperidylpropylidene-4,9-dihydrothieno(2,3 - b)benzo(e)thiepine.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound of the formula

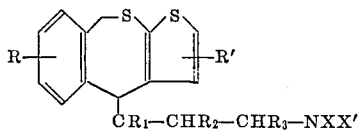

wherein R is selected from the group consisting of hydrogen, halogen, lower alkyl, lower alkoxy, lower alkylmercapto and trifluoromethyl, wherein R' is selected from the group consisting of hydrogen, halogen, lower alkyl, lower alkoxy, lower alkylmercapto and trifluoromethyl, wherein $R_1$, $R_2$ and $R_3$ are each selected from the group consisting of hydrogen and lower alkyl in which case NXX' is selected from the group consisting of lower alkyl amino radicals and saturated heterocyclic amino radicals, the latter having 4 to 5 carbon atoms, and wherein if two of the substituents $R_1$, $R_2$ and $R_3$ are hydrogen, the third of said substituents together with X may be an alkylene chain of 2–4 carbon atoms in which case X' is lower alkyl of 1–4 carbon atoms or a pharmaceutically acceptable acid addition salt of said compound.

2. A compound of the formula defined in claim 1, said compound being 4-(3-dimethylaminopropylidene-4,9-dihydrothieno(2,3-b)benzo(e)thiepine.

3. A compound of the formula defined in claim 1, said compound being 4-(3-dimethylaminopropylidene)-4,9-dihydrothieno(2,3-b)benzo(e)thiepine hydrochloride.

4. A compound of the formula defined in claim 1, said compound being 4-(3-diethylaminopropylidene)-4,9-dihydrothieno(2,3-b)benzo(e)thiepine.

5. A compound of the formula defined in claim 1, said compound being 4-(3-diethylaminopropylidene)-4,9-dihydrothieno(2,3-b)benzo(e)thiepine hydrochloride.

6. Physiologically compatible acid addition salts of the compounds of claim 1.

References Cited

UNITED STATES PATENTS

| 3,306,897 | 2/1967 | Renz et al. | 260—240 |
| 3,055,888 | 9/1962 | Renz et al. | 260—240 |

FOREIGN PATENTS

| 220,921 | 4/1959 | Australia. |
| 1,948M | 7/1963 | France. |
| 1,947M | 7/1963 | France. |

OTHER REFERENCES

Rajsner, et al.: C.A. 59:277, 2–4 (1963).
Belgian Pat. No. 607,503, Derwent Belg. Pat. Reports 1962: #87A, p. 2–3 (Sandoz I).
French Pat. No. 2,122M, Derwent, Fr. Pat. Reports 1963: vol. 3, No. 2 (Sandoz II).
Gadient et al.: C.A. 58, 45746 (1963).

HENRY R. JILES, Primary Examiner

C. M. SHURKO, Assistant Examiner

U.S. Cl. X.R.

260—247, 247.1, 268, 293, 293.4, 326.5, 326.8, 332.2, 332.3, 332.5, 999